(12) United States Patent
Sasahara

(10) Patent No.: US 11,791,653 B2
(45) Date of Patent: Oct. 17, 2023

(54) POWER SUPPLY CONTROL APPARATUS

(71) Applicant: YAZAKI CORPORATION, Tokyo (JP)

(72) Inventor: Masato Sasahara, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 175 days.

(21) Appl. No.: 17/529,276

(22) Filed: Nov. 18, 2021

(65) Prior Publication Data

US 2022/0158480 A1  May 19, 2022

(30) Foreign Application Priority Data

Nov. 18, 2020 (JP) ................................ 2020-191681

(51) Int. Cl.
*H02J 9/06* (2006.01)
*H02J 7/00* (2006.01)

(52) U.S. Cl.
CPC ............ *H02J 9/061* (2013.01); *H02J 7/0048* (2020.01); *H02J 7/0068* (2013.01); *H02J 7/007182* (2020.01); *H02J 2207/20* (2020.01)

(58) Field of Classification Search
CPC ................. H02J 7/0068; H02J 2207/20; H02J 7/007182; H02J 7/0048; H02J 9/061

USPC ............................................ 307/10.1, 23, 64
See application file for complete search history.

(56) References Cited

U.S. PATENT DOCUMENTS

| | | | |
|---|---|---|---|
| 11,476,700 B2* | 10/2022 | Sasahara | H02J 7/342 |
| 2020/0047634 A1* | 2/2020 | Akaishi | B60L 53/62 |
| 2020/0262301 A1* | 8/2020 | Sasahara | B60L 3/0046 |
| 2020/0262308 A1* | 8/2020 | Sasahara | B60L 50/64 |
| 2020/0298888 A1* | 9/2020 | Ozeki | B60R 16/04 |
| 2021/0066956 A1* | 3/2021 | Izawa | H02J 7/005 |

FOREIGN PATENT DOCUMENTS

JP 2017-63543 A 3/2017

* cited by examiner

*Primary Examiner* — Michael R. Fin
(74) *Attorney, Agent, or Firm* — KENEALY VAIDYA LLP

(57) ABSTRACT

In a power supply control apparatus, a control unit configured to turn on a first switch and turn off a second switch when a backup power supply is to be charged, and turn off the first switch and turn on the second switch when electric power is to be supplied from the backup power supply to a backup load. The control unit sets an upper limit value of a state of charge of the backup power supply based on an output voltage to the backup load obtained by subtracting, from an open circuit voltage of the backup power supply, a voltage drop from an internal portion of the backup power supply to an output to a backup load side via the second switch.

3 Claims, 4 Drawing Sheets

POWER SUPPLY CONTROL APPARATUS

CROSS-REFERENCE TO RELATED APPLICATIONS

This application is based on and claims the benefit of priority of Japanese Patent Application No. 2020-191681 filed on Nov. 18, 2020, the entire contents of which are incorporated herein by reference.

FIELD

The present relates to a power supply control apparatus.

BACKGROUND

A vehicle power supply system including a lead battery serving as a main power supply and a lithium ion battery serving as a backup power supply has been known (see, for example, JP-A-2017-063543). In the vehicle power supply system disclosed in JP-A-2017-063543, a lithium ion battery is connected to a lead battery, an alternator, a load, and a backup load via a DC/DC converter. The DC/DC converter is a bidirectional DC/DC converter that converts a voltage on the lead battery side and supplies the converted voltage to the lithium ion battery side or converts a voltage on the lithium ion battery side and supplies the converted voltage to the lead battery side by a switching operation.

SUMMARY

In the vehicle power supply system described above, when a ternary lithium ion battery or the like having a higher voltage at the time of full charge than a 12V battery is used as a backup power supply, a voltage of the backup power supply at the time of full charge exceeds an upper limit value of a load voltage of a backup power supply system. Therefore, it is necessary to step down, by the DC/DC converter, a voltage to be supplied from a backup power supply side to a backup load side.

However, when a required output of the DC/DC converter increases due to an increase in a load to be driven, a cost of the DC/DC converter increases since, for example, the DC/DC converter needs to be significantly changed in structure in order to improve cooling performance of the DC/DC converter or components need to be increased in size. Here, by discharging electric power from the backup power supply side to the backup load side without using the DC/DC converter, a cost of the DC/DC converter can be reduced. However, in this case, it is necessary to suppress an output voltage from the backup power supply to the backup load to be equal to or less than the upper limit value of the load voltage of the backup power supply system. For this purpose, it is necessary to keep a state of charge of the backup power supply low so that an open circuit voltage of the backup power supply is equal to or lower than the upper limit value of the load voltage of the backup power supply system. Therefore, a usage range of a capacity of the backup power supply is narrowed, and the capacity of the backup power supply cannot be effectively used.

The present disclosure has been made in view of the above circumstances, and an object of the present disclosure is to provide a power supply control apparatus capable of reducing a cost of a DC/DC converter and effectively using a capacity of a backup power supply in a power supply system in which a voltage of the backup power supply at the time of full charge is higher than that of a main power supply.

The present disclosure provides a power supply control apparatus in a power supply system including a power supply unit, a main power supply, and a backup power supply having a higher voltage at a time of full charge than the main power supply, the power supply control apparatus connecting the power supply unit, the main power supply, and the backup power supply and configured to control charging and discharging of the backup power supply, the power supply control apparatus including: a power line to which the power supply unit, the main power supply, the backup power supply, and a backup load are connected; a first switch provided on the power line and configured to turn on/off connection between the power supply unit as well as the main power supply and the backup power supply; a second switch provided on the power line and configured to turn on/off connection between the backup power supply and the backup load; a charging DC/DC converter connected to the power line in parallel with the second switch and configured to convert a voltage supplied from a power supply unit side and supply a converted voltage to a backup power supply side; and a control unit configured to turn on the first switch and turn off the second switch when the backup power supply is to be charged, and turn off the first switch and turn on the second switch when electric power is to be supplied from the backup power supply to the backup load, wherein the control unit is configured to set an upper limit value of a state of charge of the backup power supply based on an output voltage to the backup load obtained by subtracting, from an open circuit voltage of the backup power supply, a voltage drop from an internal portion of the backup power supply to an output to a backup load side via the second switch.

According to the present disclosure, by setting the upper limit value of the state of charge of the backup power supply based on the output voltage to the backup load that is obtained by subtracting, from the open circuit voltage of the backup power supply, the voltage drop from the internal portion of the backup power supply to the backup load side via the second switch, a cost of a DC/DC converter can be reduced and a capacity of the backup power supply can be effectively used in the power supply system in which the voltage of the backup power supply at the time of full charge is higher than that of the main power supply.

DETAILED DESCRIPTION

Hereinafter, the present disclosure will be described in accordance with a preferred embodiment. The present disclosure is not limited to the embodiment to be described below, and can be changed as appropriate without departing from the scope of the present disclosure. Although some configurations are not illustrated or described in the embodiment to be described below, a known or well-known technique is appropriately applied to details of an omitted technique within a range in which no contradiction occurs to contents to be described below.

Figure 1:
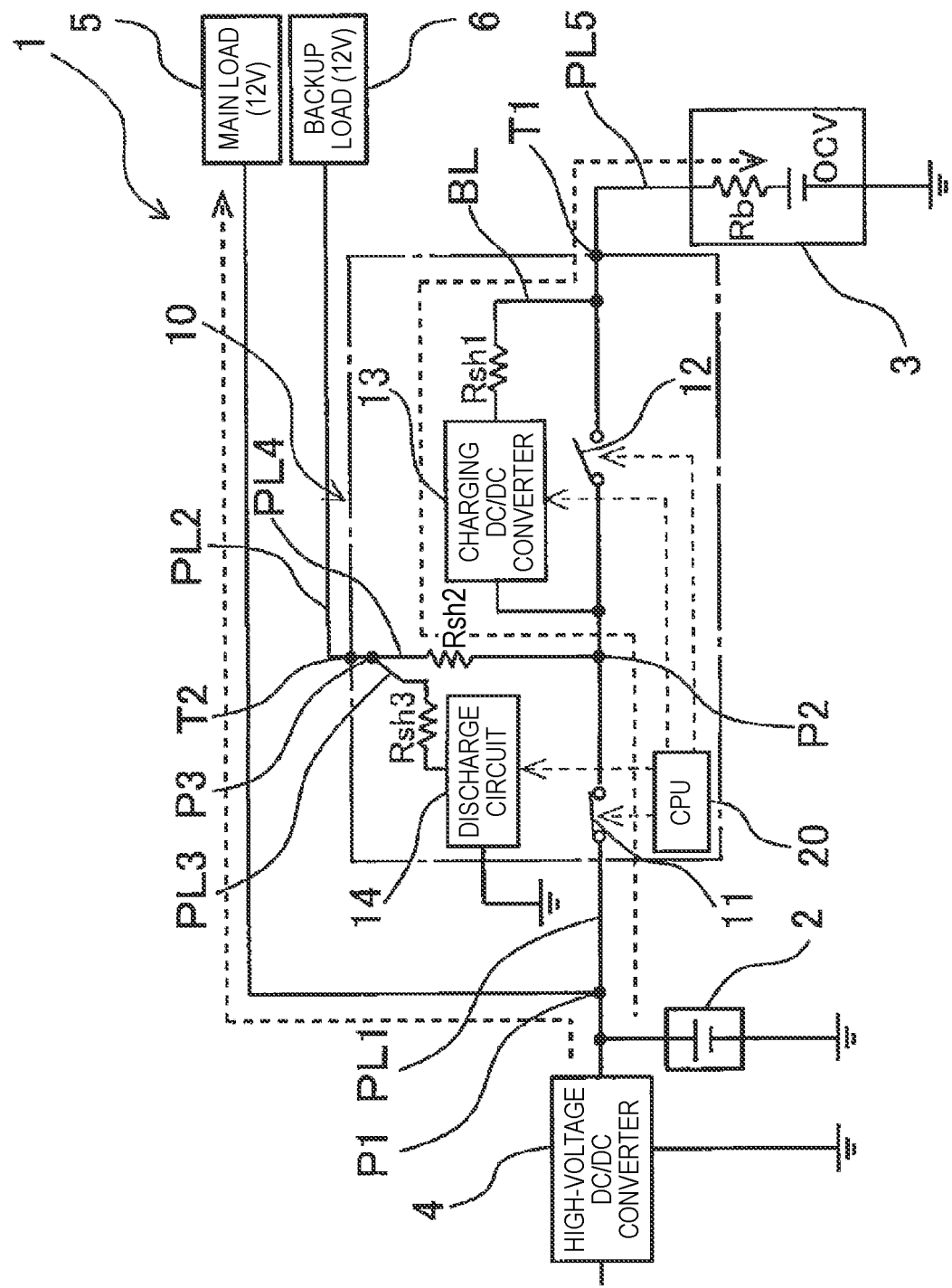
FIG. 1 is a diagram illustrating an in-vehicle power supply system including a control module according to an embodiment of the present disclosure.
Figure 2:
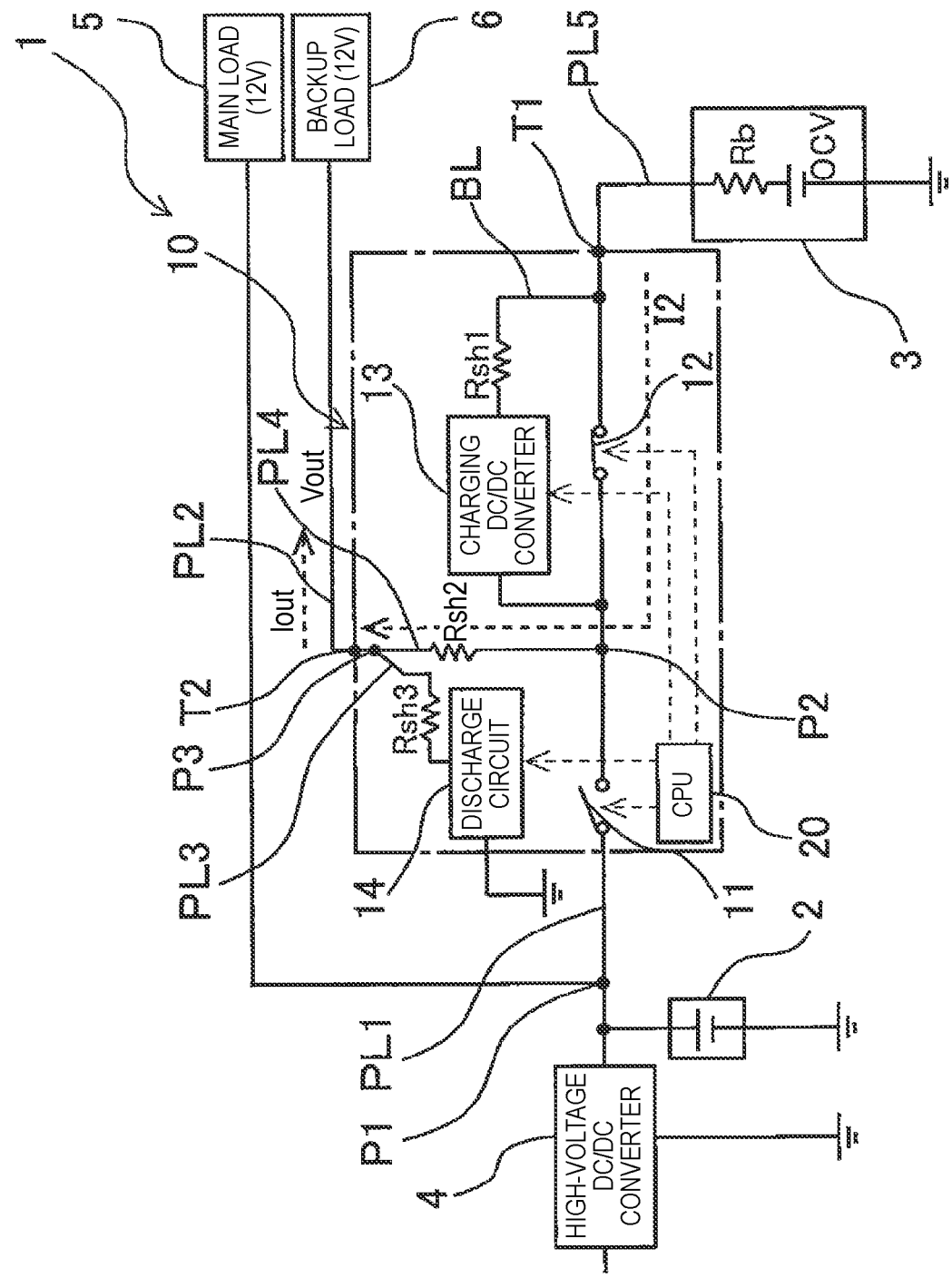
FIG. 2 is a diagram illustrating the in-vehicle power supply system including a control module according to the embodiment of the present disclosure.
Figure 3:
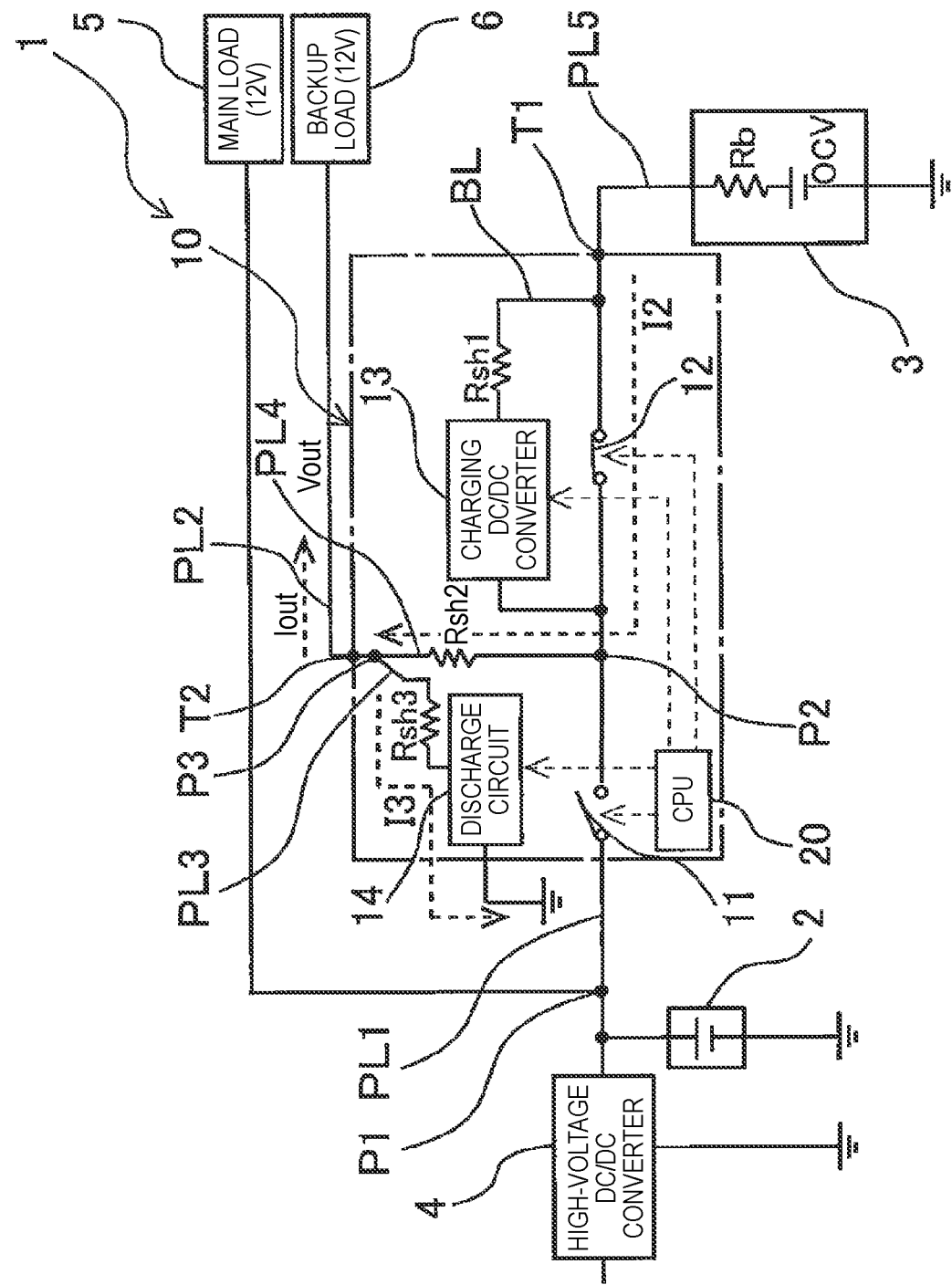
FIG. 3 is a diagram illustrating the in-vehicle power supply system including a control module according to the embodiment of the present disclosure.

FIGS. 1 to 3 are diagrams illustrating an in-vehicle power supply system 1 including a control module 10 according to an embodiment of the present disclosure. As illustrated in these drawings, the in-vehicle power supply system 1 as an example of a power supply system includes a main battery 2 as an example of a main power supply, a backup battery 3 as an example of a backup power supply, a high-voltage DC/DC converter 4 as an example of power supply unit, and a control module 10 as an example of a power supply control apparatus. In the in-vehicle power supply system 1 of the present embodiment, the main battery 2 is a regular power supply that supplies electric power to a 12V main load 5, and the backup battery 3 is an emergency power supply that supplies electric power to a 12V backup load 6. In addition, the main battery 2 of the present embodiment is a 12V lead storage battery. In contrast, the backup battery 3 of the present embodiment is a ternary lithium ion secondary battery, and has a higher voltage than the main battery 2.

The power supply unit includes, for example, a high-voltage power supply of 48V or the like, a generator such as an alternator, and the high-voltage DC/DC converter 4. The high-voltage DC/DC converter 4 steps down a high voltage output from the high-voltage power supply and the generator and outputs the stepped-down high voltage. The main battery 2, the main load 5, the backup load 6, and the backup battery 3 are connected to a power line PL1 connected to an output terminal of the high-voltage DC/DC converter 4.

As illustrated in FIG. 1, in a normal state where no power supply failure occurs in a main power supply system, electric power output from the high-voltage DC/DC converter 4 is supplied to the main load 5 and the main battery 2. At the time of charging the backup battery 3, the electric power output from the high-voltage DC/DC converter 4 is supplied to the backup battery 3 via the control module 10. On the other hand, as illustrated in FIG. 2, when a power supply failure occurs in the main power supply system, electric power is supplied from the backup battery 3 to the backup load 6. That is, charging and discharging of the backup battery 3 is controlled by the control module 10 so that: the backup battery 3 is charged by the electric power output from the high-voltage DC/DC converter 4 in the normal state where no power supply failure occurs in the main power supply system as illustrated in FIG. 1, and electric power is discharged from the backup battery 3 to the backup load 6 when a power supply failure occurs in the main power supply system as illustrated in FIG. 2.

The control module 10 includes a first switch 11, a second switch 12, a charging DC/DC converter 13, a discharge circuit 14, a central processing unit (CPU) 20 as an example of a control unit, and the power line PL1. The first switch 11 and the second switch 12 are provided on the power line PL1.

The first switch 11 is provided on the power line PL1, between a connection point P1 of the main load 5 and a connection point P2 of the backup load 6. The first switch 11 is a transistor switch such as a metal oxide semiconductor field effect transistor (MOSFET), and is turned on in a normal state where no power supply failure occurs in the main power supply system to allow a current to flow from the high-voltage DC/DC converter 4 side to the backup battery 3 side, as illustrated in FIG. 1. On the other hand, the first switch 11 is turned off when a power supply failure occurs in the main power supply system to cut off a current flowing from the backup battery 3 side to the high-voltage DC/DC converter 4 side, as illustrated in FIG. 2.

The second switch 12 is provided on the power line PL1, between the connection point P2 of the backup load 6 and a VB2 terminal T1 as an example of a first terminal. The VB2 terminal T1 is a terminal of the control module 10 to which a power line PL5 connected to the backup battery 3 is connected. The second switch 12 is a transistor switch such as a MOSFET, and is turned off when no power supply failure occurs in the main power supply system (at the time of charging the backup battery 3) to cut off a current flowing from the high-voltage DC/DC converter 4 side to the backup battery 3 side, as illustrated in FIG. 1. On the other hand, when a power supply failure occurs in the main power supply system (when the backup battery 3 discharges electric power) as illustrated in FIG. 2, the second switch 12 is turned on to allow a current to flow from the backup battery 3 side to the backup load 6 side.

The charging DC/DC converter 13 is connected to the power line PL1 in parallel with the second switch 12. In other words, the charging DC/DC converter 13 is provided on a bypass line BL that bypasses the second switch 12. A shunt resistor Rsh1 for a current sensor is provided on the bypass line BL.

When no power supply failure occurs in the main power supply system as illustrated in FIG. 1, the charging DC/DC converter 13 converts a voltage output from the high-voltage DC/DC converter 4 and outputs the converted voltage to the backup battery 3. Here, a current flowing through the charging DC/DC converter 13 at the time of charging the backup battery 3 is a very small current of about 4 A, and an output capacity required for the charging DC/DC converter 13 is small. On the other hand, when a power supply failure occurs in the main power supply system as illustrated in FIG. 2, a current output from the backup battery 3 to the backup load 6 is a large current of about 80 A.

The discharge circuit 14 is connected to a power line PL4, which connects the power line PL1 and a Vout terminal T2 as an example of a second terminal, via a power line PL3. The Vout terminal T2 is a terminal to which a power line PL2 connected to the backup load 6 is connected. The discharge circuit 14 includes a switch (not shown). When the backup battery 3 discharges electric power while the switch of the discharge circuit 14 is turned on, a current flows from the power line PL3 to the discharge circuit 14 as illustrated in FIG. 3. A shunt resistor Rsh2 for a current sensor is provided on the power line PL4, between the connection point P2 and the connection point P3 of the power line PL3. In addition, a shunt resistor Rsh3 for a current sensor is provided on the power line PL3.

A CPU 20 controls the first switch 11, the second switch 12, the charging DC/DC converter 13, and the discharge circuit 14. For example, in a case where a power supply failure occurs in the main power supply system, such as one that an output voltage of the main battery 2 decreases to a predetermined value or less, the CPU 20 turns off the first switch 11 and turns on the second switch 12, as illustrated in FIG. 2.

When no power supply failure occurs in the main power supply system, the CPU 20 turns on the first switch 11, turns off the second switch 12, and turns on the charging DC/DC converter 13, as illustrated in FIG. 1. Here, when charging the backup battery 3 via the charging DC/DC converter 13, the CPU 20 sets a state of charge of the backup battery 3 to an appropriate value in relation to an allowable range of a load voltage of a backup power supply system. Further, the CPU 20 executes processing for estimating an upper limit value SOC2 of the state of charge of the backup battery 3, which is determined in relation to an upper limit value Vmax of the load voltage of the backup power supply system, when the vehicle is stopped (when the ignition is OFF). Hereinafter, the processing will be described.

Figure 4:
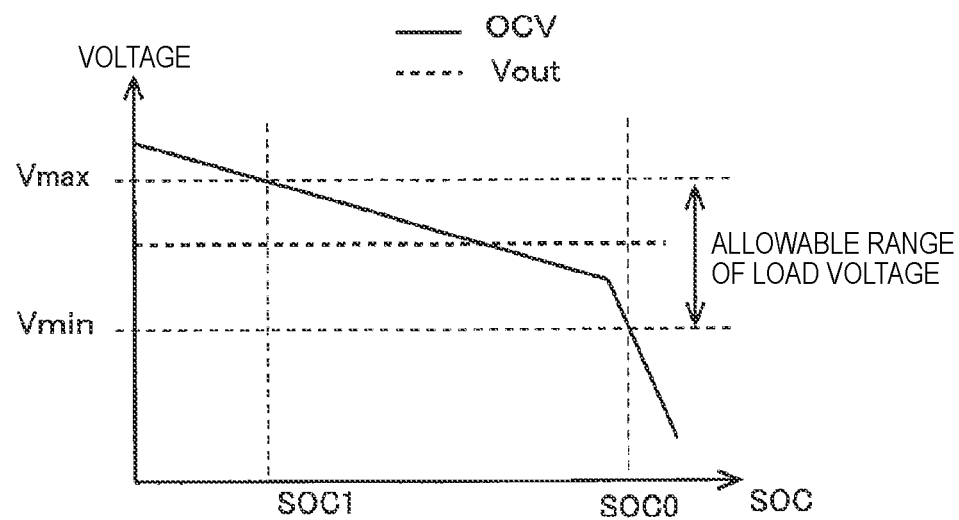
FIG. 4 is a graph illustrating a relationship between a voltage and a state of charge of a backup battery in a case of charging the backup battery without executing estimation processing of estimating an upper limit value of the state of charge of the backup battery.

FIG. 4 is a graph illustrating a relationship between a voltage and a state of charge of the backup battery 3 in a case of charging the backup battery 3 without executing the estimation processing of estimating the upper limit value SOC2 of the state of charge SOC of the backup battery 3.

The backup power supply system has an allowable range of the load voltage, and the upper limit value Vmax is, for example, 16V. On the other hand, an open circuit voltage OCV at the time of full charge of the backup battery 3 of the present embodiment, which is a ternary lithium ion secondary battery, is, for example, 16.8V, which exceeds the upper limit value Vmax of the load voltage of the backup power supply system. Here, in a case where the estimation processing of estimating the upper limit value SOC2 of the state of charge SOC of the backup battery 3 to be described later is not executed, since an output voltage Vout indicated by a broken line in FIG. 4 cannot be calculated with high accuracy, an upper limit value SOC1 of the state of charge SOC of the backup battery 3 is set to be excessively low in order to make the output voltage Vout equal to or less than the upper limit value Vmax of the load voltage of the backup power supply system. Accordingly, a usage range of a capacity of the backup battery 3 is narrowed.

Figure 5:
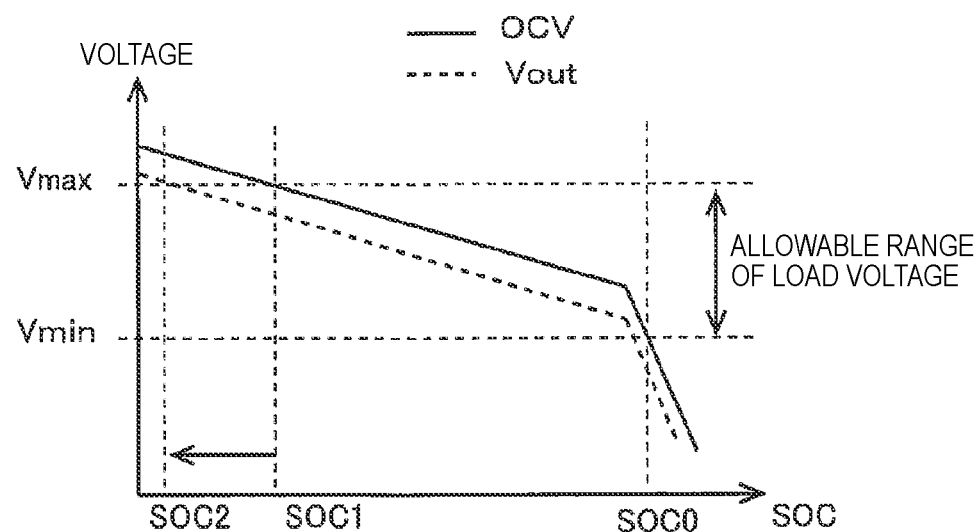
FIG. 5 is a graph illustrating a relationship between a voltage and a state of charge of the backup battery in a case of charging the backup battery, after the estimation processing of estimating an upper limit value of the state of charge of the backup battery is executed.

FIG. 5 is a graph illustrating the relationship between the state of charge SOC of the backup battery 3 and the voltage in the case of charging the backup battery 3, after the estimation processing of estimating the upper limit value SOC2 of the state of charge SOC of the backup battery 3 is executed. As illustrated in this graph, in the present embodiment, the output voltage Vout from the backup battery 3 to the backup load 6 is appropriately calculated by a method to be described later, and the upper limit value SOC2 of the state of charge SOC, which is an appropriate value in relation to the upper limit value Vmax of the load voltage of the backup power supply system, is estimated based on the calculation result. Accordingly, it is possible to appropriately set the state of charge SOC of the backup battery 3 such that the usage range of the capacity of the backup battery 3 is expanded while the output voltage Vout does not exceed the upper limit value Vmax of the load voltage of the backup power supply system.

As illustrated in FIG. 3, the CPU 20 turns off the first switch 11, turns on the second switch 12, turns off the charging DC/DC converter 13, and turns on the discharge circuit 14. Accordingly, a current flow from the backup battery 3 to the discharge circuit 14 and the backup load 6 via the second switch 12. At this time, a current value of a current flowing through the backup load 6 is Iout, and a current value of a current flowing through the discharge circuit 14 is I3.

The output voltage Vout is calculated using the following equation (1).

$$Vout = OCV - (Iout \times Rout) \quad (1)$$

Rout is calculated using the following equation (2).

$$Rout = Rb + Rm \quad (2)$$

Rb is an internal resistance of the backup battery 3, and Rm is an internal resistance of the control module 10 from the VB2 terminal T1 to the Vout terminal T2.

Here, the current value Iout of the current output to the backup load 6 is set to a minimum value Ioutmin of a total current output to a load that is constantly driven in the backup load 6.

The internal resistance Rb of the backup battery 3 is calculated using the following equation (3).

$$Rb = \alpha(OCV - VB2)/I2 \quad (3)$$

I2 is calculated using the following equation (4).

$$I2 = Iout + I3 \quad (4)$$

α is a conversion coefficient of the internal resistance Rb of the backup battery 3 that changes according to a discharge current, and is acquired in advance by performing a characteristic evaluation test of the battery.

VB2 is a voltage of the backup battery 3, and is measured during execution of the estimation processing.

I2 is a current value of a current flowing in the control module 10 from the VB2 terminal T1 to the Vout terminal T2.

The internal resistance Rm of the control module 10 from the VB2 terminal T1 to the Vout terminal T2 via the second switch 12 is calculated using the following equation (5).

$$Rm = (VB2 - Vout)/I2 \quad (5)$$

I2 is calculated using the above equation (4).

The CPU 20 sets the upper limit value SOC2 of the state of charge SOC of the backup battery 3 to a value at which Vout=Vmax.

That is, in the estimation processing of estimating the upper limit value SOC2 of the state of charge SOC of the backup battery 3, the output voltage Vout from the Vout terminal T2 to the backup load 6 is calculated by subtracting, from the open circuit voltage OCV of the backup battery 3, a voltage drop ΔV (=Iout×Rout) from an internal portion of the backup battery 3 to the Vout terminal T2 of the control module 10. In calculating the output voltage Vout, the current value Iout of the current output from the Vout terminal T2 to the backup load 6 is set to the minimum value Ioutmin. Accordingly, by setting the state of charge SOC of the backup battery 3 to the upper limit value SOC2 of the state of charge SOC at which Vout=Vmax, it is possible to reliably prevent the output voltage Vout from exceeding the upper limit value Vmax of the load voltage of the backup power supply system, and to expand the usage range of the capacity of the backup battery 3 from SOC0 to SOC1 in FIG. 4 to SOC0 to SOC2 in FIG. 5.

Although the present disclosure has been described based on the embodiment, the present disclosure is not limited to the embodiment described above. The present disclosure may be modified as appropriate without departing from the scope of the present disclosure, or known and well-known techniques may be combined as appropriate.

For example, in the above embodiment, the discharge circuit 14 is provided and electric power is discharged from the backup battery 3 to the discharge circuit 14, and the voltage drop ΔV is calculated based on the current value I3 of a current flowing through the discharge circuit 14. Alternatively, the voltage drop ΔV may be calculated using another method.

The invention claimed is:

1. A power supply control apparatus in a power supply system including a power supply unit, a main power supply, and a backup power supply having a higher voltage at a time of full charge than the main power supply, the power supply control apparatus connecting the power supply unit, the main power supply, and the backup power supply and configured to control charging and discharging of the backup power supply, the power supply control apparatus comprising:
- a power line to which the power supply unit, the main power supply, the backup power supply, and a backup load are connected;
- a first switch provided on the power line and configured to turn on/off connection between the power supply unit as well as the main power supply and the backup power supply;
- a second switch provided on the power line and configured to turn on/off connection between the backup power supply and the backup load;
- a charging DC/DC converter connected to the power line in parallel with the second switch and configured to convert a voltage supplied from a power supply unit side and supply a converted voltage to a backup power supply side;
- a control unit configured to turn on the first switch and turn off the second switch when the backup power supply is to be charged, and turn off the first switch and turn on the second switch when electric power is to be supplied from the backup power supply to the backup load;
- a first terminal connected to the backup power supply; and
- a second terminal connected to the backup load, wherein the control unit is configured to set an upper limit value of a state of charge of the backup power supply based on an output voltage to the backup load obtained by subtracting, from an open circuit voltage of the backup power supply, a voltage drop calculated based on a sum of an internal resistance of the backup power supply and an internal resistance from the first terminal to the second terminal when the second switch is tuned on.

2. The power supply control apparatus according to claim 1, further comprising:
- a discharge circuit provided between the second switch and the backup load,
- wherein the control unit is configured to execute discharge processing of turning on the second switch to discharge electric power from the backup power supply through the discharge circuit, and calculate the voltage drop based on a current value of a current flowing through the discharge circuit during execution of the discharge processing, a current value of a current output to the backup load, a current value of a current flowing from the backup power supply to the backup load side via the second switch, a voltage of the backup power supply, and the open circuit voltage.

3. The power supply control apparatus according to claim 1, wherein the control unit is configured to set the upper limit value of the state of charge of the backup power supply such that the output voltage to the backup load is equal to an upper limit value of a predetermined load voltage.

* * * * *